United States Patent
Fujii et al.

(10) Patent No.: US 9,493,210 B2
(45) Date of Patent: Nov. 15, 2016

(54) ELECTRIC POWER STORAGE HOLDER

(75) Inventors: Kazuhiro Fujii, Osaka (JP); Takafumi Katsura, Osaka (JP)

(73) Assignee: Shimano Inc., Osaka (JP)

( * ) Notice: Subject to any disclaimer, the term of this patent is extended or adjusted under 35 U.S.C. 154(b) by 755 days.

(21) Appl. No.: 13/599,653

(22) Filed: Aug. 30, 2012

(65) Prior Publication Data

US 2013/0147153 A1   Jun. 13, 2013

(30) Foreign Application Priority Data

Dec. 9, 2011 (JP) ................. 2011-269825

(51) Int. Cl.
    *B62J 11/00* (2006.01)
    *B62M 6/90* (2010.01)
    *B62K 19/30* (2006.01)
    *H01M 2/10* (2006.01)

(52) U.S. Cl.
    CPC ............. *B62M 6/90* (2013.01); *B62K 19/30* (2013.01); *H01M 2/1072* (2013.01); *B62J 11/00* (2013.01); *B62K 2208/00* (2013.01); *H01M 2220/20* (2013.01); *Y10S 224/902* (2013.01)

(58) Field of Classification Search
    CPC Y10S 224/902; B62J 11/00; B62K 2208/00; B62M 6/90
    USPC ................ 224/427, 902; 248/219.2
    See application file for complete search history.

(56) References Cited

U.S. PATENT DOCUMENTS

| | | | |
|---|---|---|---|
| 4,736,921 A * | 4/1988 | Zane et al. .......... | 248/316.2 |
| 4,814,951 A * | 3/1989 | Larsen .............. | B62J 6/001 340/432 |
| 4,833,777 A | 5/1989 | Clark | |
| 4,901,209 A * | 2/1990 | Nitz .............. | B62K 19/16 280/281.1 |
| 5,247,431 A * | 9/1993 | Liu .............. | B62J 6/005 362/474 |
| 5,618,052 A * | 4/1997 | Rendall .......... | B62J 1/08 280/288.4 |
| 6,158,881 A * | 12/2000 | Carne .......... | B62J 6/003 362/183 |
| 6,224,997 B1 * | 5/2001 | Papadopoulos ...... | 429/99 |
| 6,564,982 B1 * | 5/2003 | Woods .......... | B62J 9/001 224/420 |
| 7,393,125 B1 | 7/2008 | Lai | |
| 7,785,723 B2 * | 8/2010 | Liu .............. | H01M 2/105 429/151 |
| 7,871,189 B2 * | 1/2011 | Li .............. | 362/474 |
| 8,162,191 B2 | 4/2012 | Tetsuka et al. | |
| 8,183,726 B2 | 5/2012 | Rittenhouse | |
| 8,459,682 B2 * | 6/2013 | Calfee .......... | 280/288.4 |
| 8,906,528 B2 * | 12/2014 | Fujii .......... | B62J 1/08 429/100 |
| 9,159,974 B2 * | 10/2015 | Kwag .......... | B62M 6/90 |
| 2008/0088108 A1 * | 4/2008 | Yoshida et al. ...... | 280/200 |
| 2008/0164674 A1 * | 7/2008 | Chen .............. | 280/280 |
| 2008/0179858 A1 * | 7/2008 | Chen .............. | 280/281.1 |

(Continued)

FOREIGN PATENT DOCUMENTS

| | | |
|---|---|---|
| CN | 1575240 A | 2/2005 |
| DE | 1694172 U | 3/1955 |

(Continued)

*Primary Examiner* — Justin Larson
(74) *Attorney, Agent, or Firm* — Global IP Counselors (57) ABSTRACT

An electric power storage holder is inserted in a seat tube of a bicycle frame and holds an electric power storage member. The electric power storage holder includes a restricting section and a holding section. The restricting section contacts an end edge of an open end section of a seat tube to restrict axial movement of the holder in one of axial directions of the seat tube, the one of the axial directions being a direction in which the seat tithe extends. The holding section holds the electric power storage member.

20 Claims, 6 Drawing Sheets

(56) References Cited

U.S. PATENT DOCUMENTS

2011/0042156 A1   2/2011  Vincenz
2012/0049483 A1   3/2012  Dodman et al.
2014/0141310 A1*  5/2014  Li ................. H01M 2/1083
                                                          429/100

FOREIGN PATENT DOCUMENTS

DE       8714256 U1    1/1988
DE       9010590 U1   10/1990
JP       2002-2571 A    1/2002

* cited by examiner

ELECTRIC POWER STORAGE HOLDER

CROSS-REFERENCE TO RELATED APPLICATIONS

This application claims priority under 35 U.S.C. §119 to Japanese Patent Application No. 2011-269825, filed Dec. 9, 2011. The entire disclosure of Japanese Patent Application No. 2011-269825 is hereby incorporated herein by reference.

BACKGROUND

Field of the Invention

This invention generally relates to an electric power storage member, a holder that holds the electric power storage member, and an electric power source assembly that has the holder and the electric power storage member.

Background Information

There are known electric power storage holders (e.g., see Japanese Laid-Open Patent Publication No. 2002-2571) for holding a battery or other electric power storage member serving to supply electric power to an electric powered transmission of other electrical component installed on a bicycle. A conventional holder is arranged, for example, on an exterior portion of a down tube of a bicycle frame.

SUMMARY

Generally, the present disclosure is directed to various features of an electric power storage holder.

Since conventional electric power storage holders are typically arranged on an external portion of the bicycle frame, the conventional electric power storage holder degrades the appearance of the bicycle.

One object of the present invention is to provide an electric power storage holder for holding a electric power storage member that can hold the electric power storage member without degrading the aesthetic appearance of the bicycle.

In accordance with a first aspect of the invention, an electric power storage holder is inserted in a seat tube of a bicycle frame and holds an electric power storage member. The electric power storage holder basically comprises a restricting section and a holding section. The restricting section contacts an end edge of an open end section of a seat tube to restrict axial movement of the holder in one of axial directions of the seat tube, the one of the axial directions being a direction in which the seat tube extends. The holding section holds the electric power storage member.

With this electric power storage holder, the electric power storage member is held in the holding section and the holder is inserted into the seat tube. The restricting section contacts the open end section of the seat tube such that holder is attached to an interior portion of the seat tube. With this aspect, the holder is installed inside a seat tube configured to have a saddle mounted to the end of the seat tube where the open end section is located, and movement of the holder in the insertion direction is restricted. As a result, the electric power storage member can be held without degrading the aesthetic appearance of the bicycle.

In accordance with a second aspect, the electric power storage holder according to the first aspect is provided such that the holding section is formed by a first member having a first contacting section that contacts the electric power storage member, and a second member having a second contacting section that engages with the first member and that contacts the electric power storage member.

With this aspect, the holder can easily hold the electric power storage member because the holder is divided in two.

In accordance with a third aspect, the electric power storage holder according to the second aspect further comprises a positioning section provided on at least one of the first contacting section and the second contacting section to position the electric power storage member. With this aspect, the electric power storage member can be held more reliably because it is positioned in the holder by the positioning section.

In accordance with a fourth aspect, the electric power storage holder according to the third aspect is provided such that the positioning section includes one of a recessed section and a protruding section. The one of the recessed section and protruding section is configured to engage with the other of the protruding section and the recessed section, which is provided on the electric power storage member to position the electric power storage member. With this aspect, the electric power storage member can be positioned with a simple structure having a recessed section and a protruding section.

In accordance with a fifth aspect, the electric power storage holder according to any one of the first to fourth aspects further comprises a guide hole for guiding a cable from inside the seat tube to outside the seat tube. With this aspect, a cable for supplying electric power from the electric power storage member can be guided to the exterior of the seat tube through the guide hole provided in the holder. As a result, the cable can be attached and detached to and from the electric power storage member with the holder installed on the bicycle frame.

In accordance with a sixth aspect, the electric power storage holder according to any one of the second to fourth aspects is provided such that the first member and the second member form a guide hole for guiding a cable from inside the seat tube to outside the seat tube, the guide hole being defined by a first groove provided in the first member and a second groove provided in the second member. With this aspect, the guide holed can be formed in a simpler fashion.

In accordance with a seventh aspect, an electric power source holder is inserted in an open end section of a bicycle and holds an electric power storage member. The holder has an insertion section and a holding section. The insertion section is inserted into the open end section and frictionally fixed in the open end section. The holding section holds the electric power storage member. With this holder, the holder can be installed on a bicycle easily by inserting (fitting) the holder into the open end section of the bicycle with the electric power storage member held in the holding section.

In accordance with an eighth aspect, an electric power source assembly includes electric power storage holder according to any one of the first to seventh aspects, and further comprises the electric power storage member. With this electric power source assembly, the same operational effects are obtained as with the first to seventh aspects.

In accordance with a ninth aspect, the electric power source assembly according to any one of the first to eighth aspects is provided such that the electric power storage member includes a case held by the holder, and at least one electric power storage element arranged inside the case. With this electric power storage member, the electric power storage element, e.g., a capacitor or a battery, is not exposed to the outside because it is arranged inside the case. As a result, the service life of the electric power storage element is improved. With this electric power storage member, the same operational effects are obtained as with the first to seventh aspects.

In accordance with a tenth aspect, the electric power source assembly according to the ninth aspect is provided such that the case has a cylindrical shape with at least one planar surface on an external circumferential surface thereof. With this aspect, the case can be positioned with respect to the holder by the planar surface of the case contacting the holder.

In accordance with an eleventh aspect, the electric power source assembly according to the tenth aspect is provided such that the case has a cylindrical shape with at least one recessed section or protruding section on an external circumferential surface thereof. With this aspect, the case can be positioned with respect to the holder by engaging the recessed section or the protruding section of the case with the holder.

In accordance with a twelfth aspect, the electric power source assembly according to any one of the ninth to first aspects is provided such that the electric power storage element is a secondary battery (i.e., a rechargeable battery). With this aspect, the electric power storage element can be used repeatedly.

With the electric power storage holder, as discussed below in more detail, in the case of a bicycle frame on which a saddle is mounted to a seat tube of the bicycle frame without using a seat post, the holder is inserted into the open end section of the seat tube. It is also possible to insert the holder into an open end section of another portion of the bicycle frame. In this way, the holder is hidden by the bicycle frame and the electric power storage member can be held without degrading the aesthetic appearance.

BRIEF DESCRIPTION OF THE DRAWINGS

Referring now to the attached drawings which form apart of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 4, an electric power source assembly 10 is illustrated this is mounted to a seat tube 12 in accordance with a first embodiment. The electric power source assembly 10 is preferably used on a bicycle frame in which the seat tube 12 extends upward far beyond a top tube of the bicycle frame. A saddle is mounted to an upper end of the seat tube 12 with a saddle mounting member (not shown) in a conventional manner. I The seat tube 12 can be a separate member that is attached to the frame, or integrated with the bicycle frame, as an "integrated seat post" type frame. A bicycle frame that does not require the use of a separate seat post is typically called an "integrated seat post" type frame. In FIGS. 1 to 4, only a portion of the seat tube 12 is shown.

The electric power source assembly 10 basically comprises an electric power source holder 20 and an electric power storage element 30. The electric power source holder 20 is configured to be inserted (fitted) into the seat tube 12 of the bicycle. The electric power storage element 30 is configured to be held by the holder 20. The seat tube 12 has an open end section 12a. In the first embodiment, the seat tube 12 comprises a large curved section 12b and a small curved section 12c connected together by two linear sections 12d. Thus, the seat tube 12 is a generally cylindrical member having a raindrop-like cross sectional shape. However, the seat tube is not limited to a raindrop-like cross sectional shape and any shape is acceptable so long as the seat tube has an open end section. For example, it is acceptable for the seat tube to be a cylindrical member having an elliptical, a circular, or a polygonal cross sectional shape.

Figure 3:
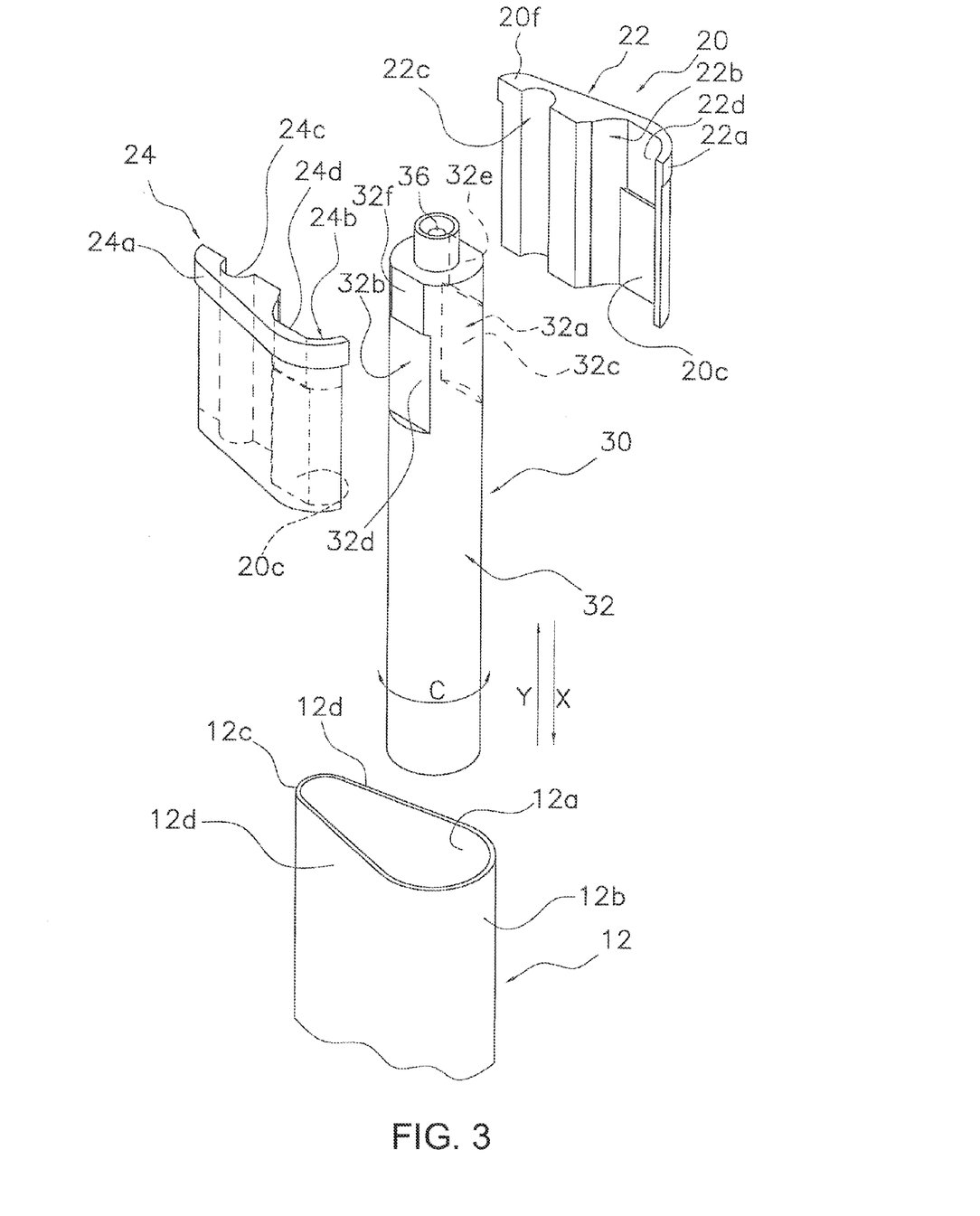
FIG. 3 is an exploded perspective view of the electric power source assembly illustrated in FIGS. 1 and 2.
Figure 4:
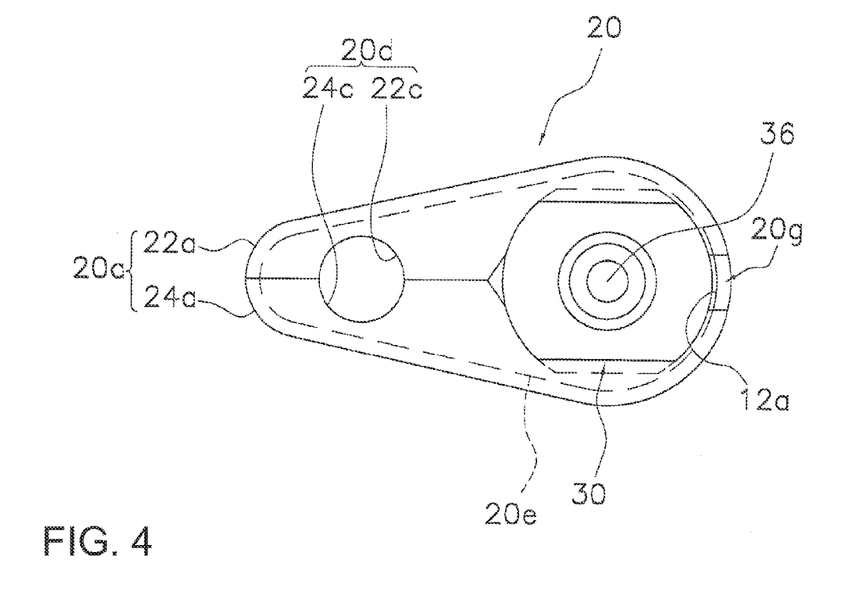
FIG. 4 is a plan view of the electric power source assembly illustrated in FIGS. 1 to 3.

The holder 20 is made of, for example, a polyester resin, a polyamide resin, or another synthetic resin. As shown in FIG. 3, the holder 20 has a restricting section 20a, a holding section 20b, a positioning section 20c and a guide hole 20d. The holder 20 has an external circumferential surface 20e that fits into an internal circumferential surface of the seat tube 12. An outer contour of the external circumferential surface 20e has a raindrop-like shape in a plan view. The holder 20 has a slit 20g that is provided in provided in a portion that mates with the large curved section 12b. The slit 20g extends in an axial direction of the seat tube 12.

The holder 20 has a first member 22 and a second member 24. The first member 22 contacts the electric power storage member 30 and engages with the second member 24. The second member 24 contacts the electric power storage member 30 and engages with the first member 22. The first member 22 and the second member 24 are the same except that their shapes are inverted with respect to left and right (they are mirror images of each other). The restricting section 20a is provided on the first member 22 and the holding section 20b is provided on the second member 24.

Figure 1:
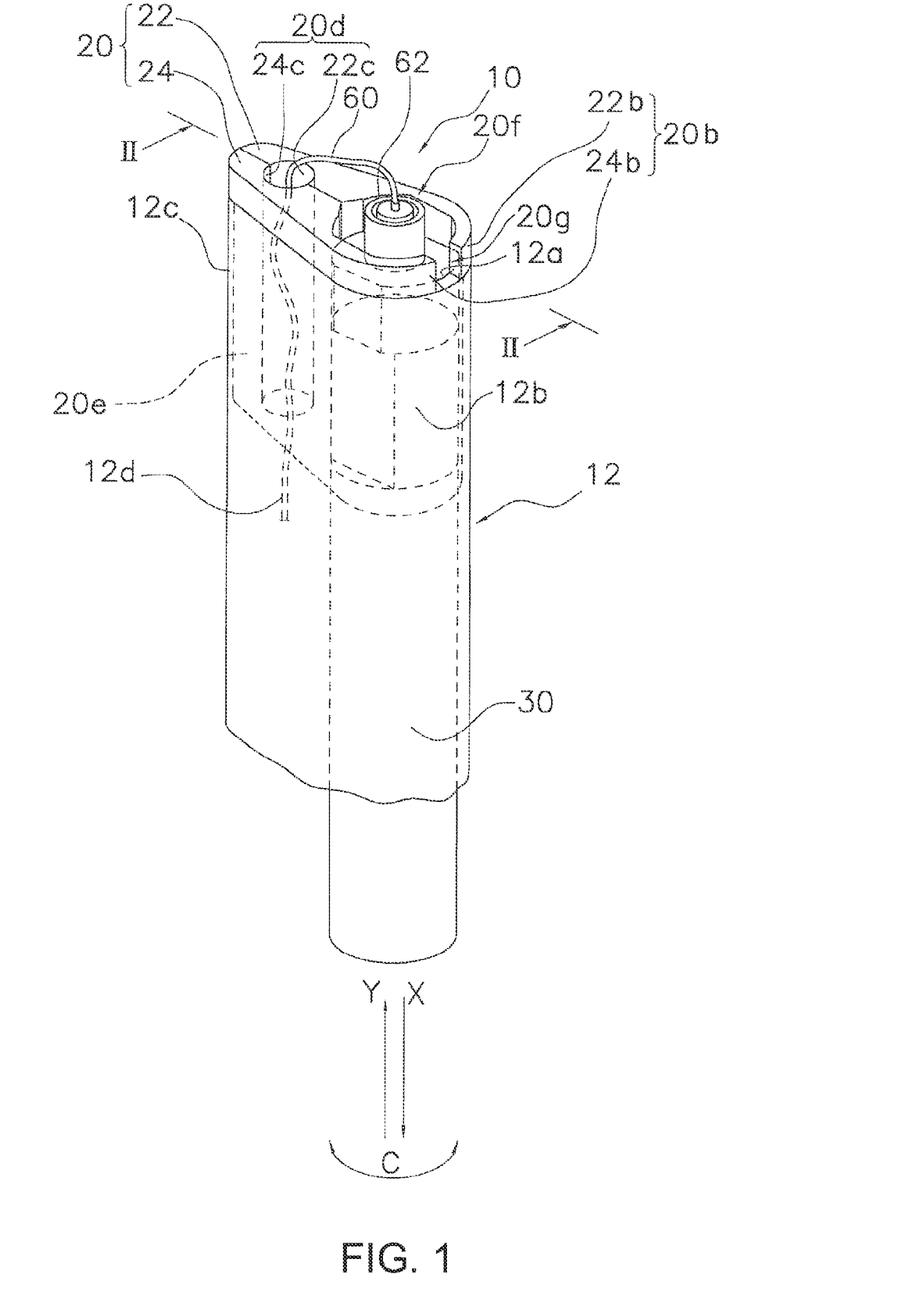
FIG. 1 is a perspective view of an electric power source assembly having an electric power source holder according to a first embodiment.
Figure 2:
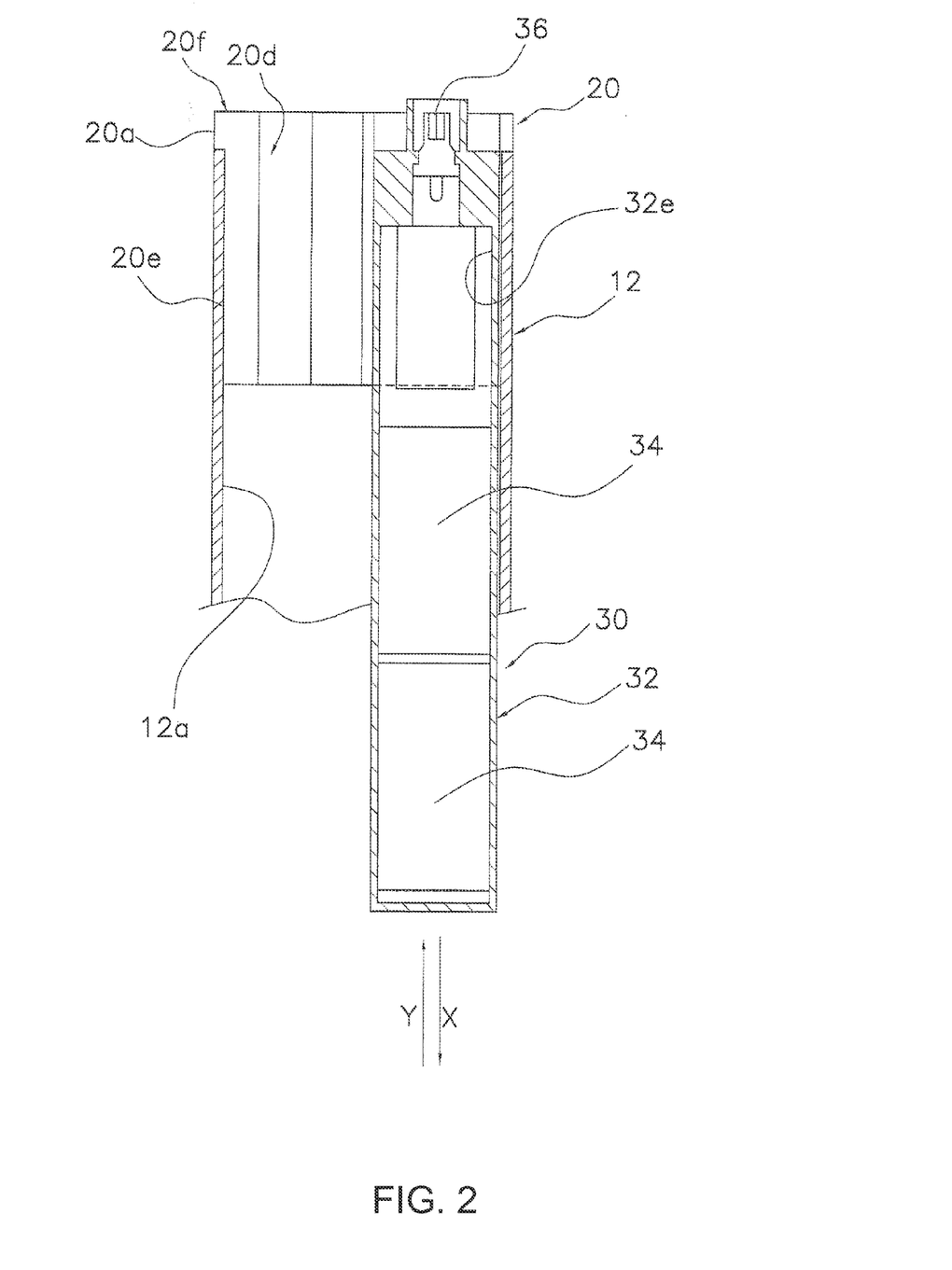
FIG. 2 is a cross sectional view of the electric power source assembly of FIG. 1 as seen along a section line II-II of FIG. 1.

As shown in FIGS. 1 to 3, the restricting section 20a contacts the end edge of the open end section 12a of the seat tube 12 such that movement of the holder 20 is restricted in a direction X in which the seat tube 12 extends from the open end section 12a. The direction X is one of axial directions of the seat tube 12. The restricting section 20a comprises a first projecting section 22a of the first member 22 and a second projecting section 24a of the second member 24. The first projecting section 22a and the second projecting section 24a are configured to protrude from the respective external circumferential surfaces 20e in directions perpendicular to the direction X and a direction Y, which is opposite the X direction, in a vicinity of an end portion 20f of the holder 20 that faces in the Y direction. The outer contour of the restraining section 20a has substantially the same shape as the seat tube 12, and the restraining section 20a becomes substantially flush with the external circumferential surface of the seat tube 12 when the holder 20 is mounted to the seat tube 12.

Figure 5:
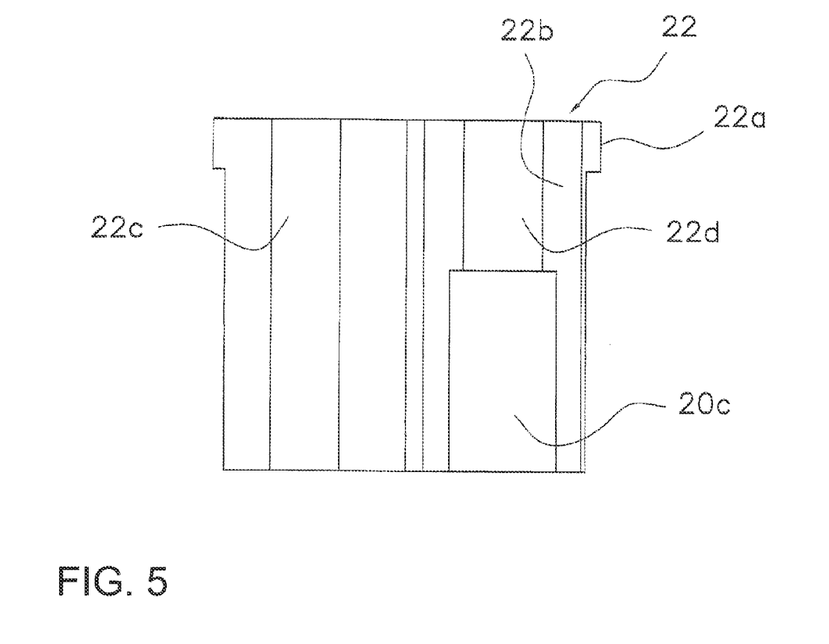
FIG. 5 is a side elevational view of a first member of the electric power source holder.
Figure 6:
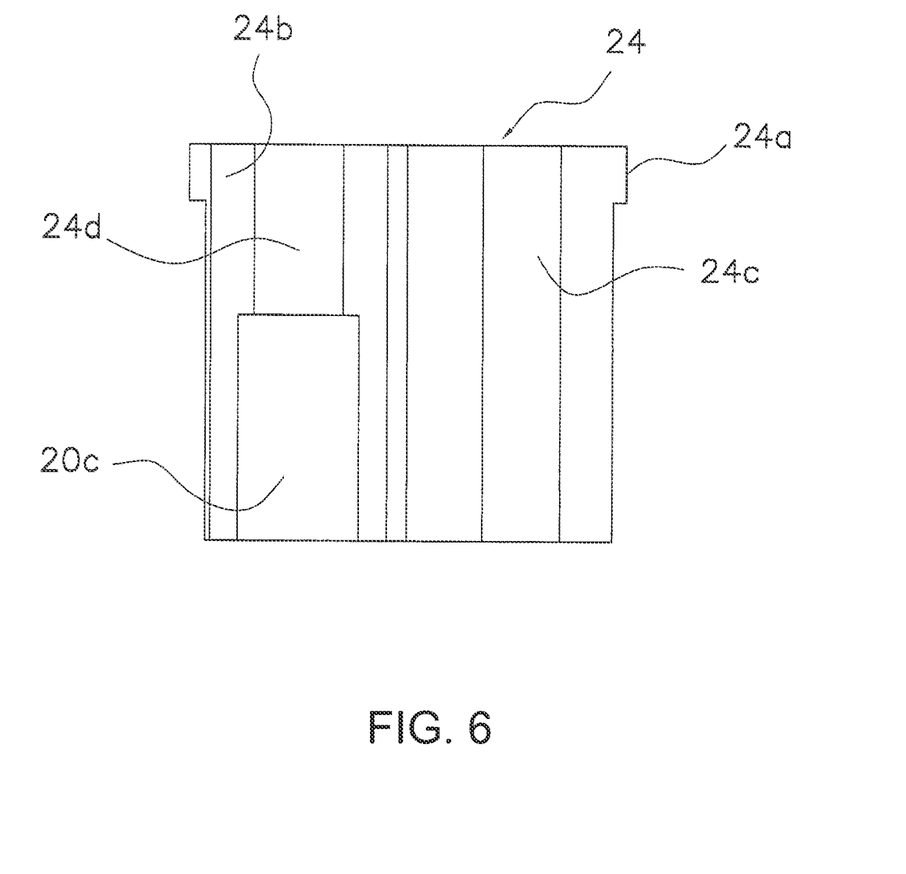
FIG. 6 is a side elevational view of a second member of the electric power source holder.

The holding section 20b is provided to hold the electric power storage member 30. The holding section 20b defines a through hole of which at least a portion is preferably circular. The holding section 20b comprises a first contacting section 22b (see FIG. 5) and a second contacting section 24b (see FIG. 6). The first contacting section 22b is provided on the first member 22 such that the first contacting section 22b contacts the electric power storage member 30. The second contacting section 24b is provided on the second member 24 such that the second contacting section 24b contacts the electric power storage member 30.

The positioning section 20c is provided to position the electric power storage element 30. The positioning section 20c is provided on at least one of the first contacting section 22b and the second contacting section 24b. In this embodiment, the positioning section 20c is provided on both the first contacting section 22b and the second contacting section 24b. As shown in FIG. 3, the positioning section 20c of the first member 22 is configured to protrude from the first contacting section 22b toward the inside of the holding section 20b (toward the electric power storage member 30). Similarly, the positioning section 20c of the second member 24 is configured to protrude toward the inside of the holding section 20b from the second contacting section 24b. Thus, in this embodiment, the positioning sections 20c of the first member 22 and the second member 24 are protruding sections. The two positioning sections 20c are configured to be parallel to each other. The two positioning sections 20c fit, respectively, into a first recessed section 32a and a second recessed section 32b (explained later) provided on an external circumferential surface of the electric power storage member 30. In this way, movement of the electric power storage member 30 is restricted in the axial directions of the seat tube 12 (the directions X and Y) and movement of the electric power storage member 30 is restricted in the circumferential directions (directions C) of the seat tube 12. That is, the positioning sections 20c positions the electric power storage member 30.

The guide hole 20d is provided to guide a cable 60 to the interior of the seat tube 12, and the cable 60 is for supplying electric power from the electric power storage member 30 to an electric component provided on the bicycle. As shown in FIG. 3, the guide hole 20d comprises a first groove 22c having a semicircular cross-sectional shape provided in the first member 22 and a second groove 24c having a semicircular cross-sectional shape provided in the second member 24.

A planar section 22d is provided in the connecting section 22d of the first member 22 on the side of the positioning section 20c that is closer to the first projecting section 22a. The planar section 22d adjoins the positioning section 20c. Similarly, a planar section 24d is provided in the connecting section 24d of the second member 24 on the side of the positioning section 20c that is closer to the first projecting section 24a. The planar section 24d adjoins the positioning section 20c. These planar sections 22d and 24d contact a first cut-away section 32e and a second cut-away section 32f (explained later) of the electric power storage member 30 and restrict movement of the electric power storage member 30 in the directions C.

As shown in FIG. 1, a connector 62 configured to connect electrically to a terminal 36 (explained later) provided on the electric power storage member 30 is provided on a tip end of the cable 60.

As shown in FIGS. 2 and 3, the electric power storage member 30 has a case 32 and at least one secondary battery 34 arranged inside the case 32. The secondary battery 34 is an example of an electric power storage element. The case 32 is a generally cylindrical piece made of, for example, a synthetic resin. A terminal 36 is arranged on a tip end of the case 32. The terminal 36 is configured to be connected to the connector 62. As shown in FIG. 3, the first recessed section 32a and the second recessed section 32b are formed in an external circumferential surface of the case 32. The first recessed section 32a has a first planar surface 32c. The second recessed section 32b has a second planar surface 32d. The first planar surface 32c and the second planar surface 32d extend so as to be parallel to each other. The first cut-way section (planar section) 32e is arranged on a portion of the case 32 that is closer to the terminal 36 than the first recessed section 32a such that it adjoins the first recessed section 32a. Similarly, the second cut-way section (planar section) 32f is arranged on a portion of the case 32 that is closer to the terminal 36 than the second recessed section 32b such that it adjoins the first recessed section 32b. The first planar surface 32c of the first recessed section 32a, the second planar surface 32d of the second recessed section 32b, the first cut-away section 32e, and the second cut-away section 32f extend so as to be parallel to one another.

In this embodiment, there are two secondary batteries 34 arranged in series. Inside the case 32, a space 32e is formed between the secondary battery 34 and the terminal 36. A control circuit, for example, is arranged in the space 32e.

Thus configured, when the electric power source assembly 10 is to be mounted to the seat tube 12, the electric power storage member 30 is pinched and positioned by the holding section 20b formed by the first member 22 and the second member 24 of the holder 20. The electric power source assembly 10 is then inserted into the open end section 12a of the seat tube 12. The installation is complete when the restricting section 20a contacts the end portion of the open end section 12a.

Figure 7:
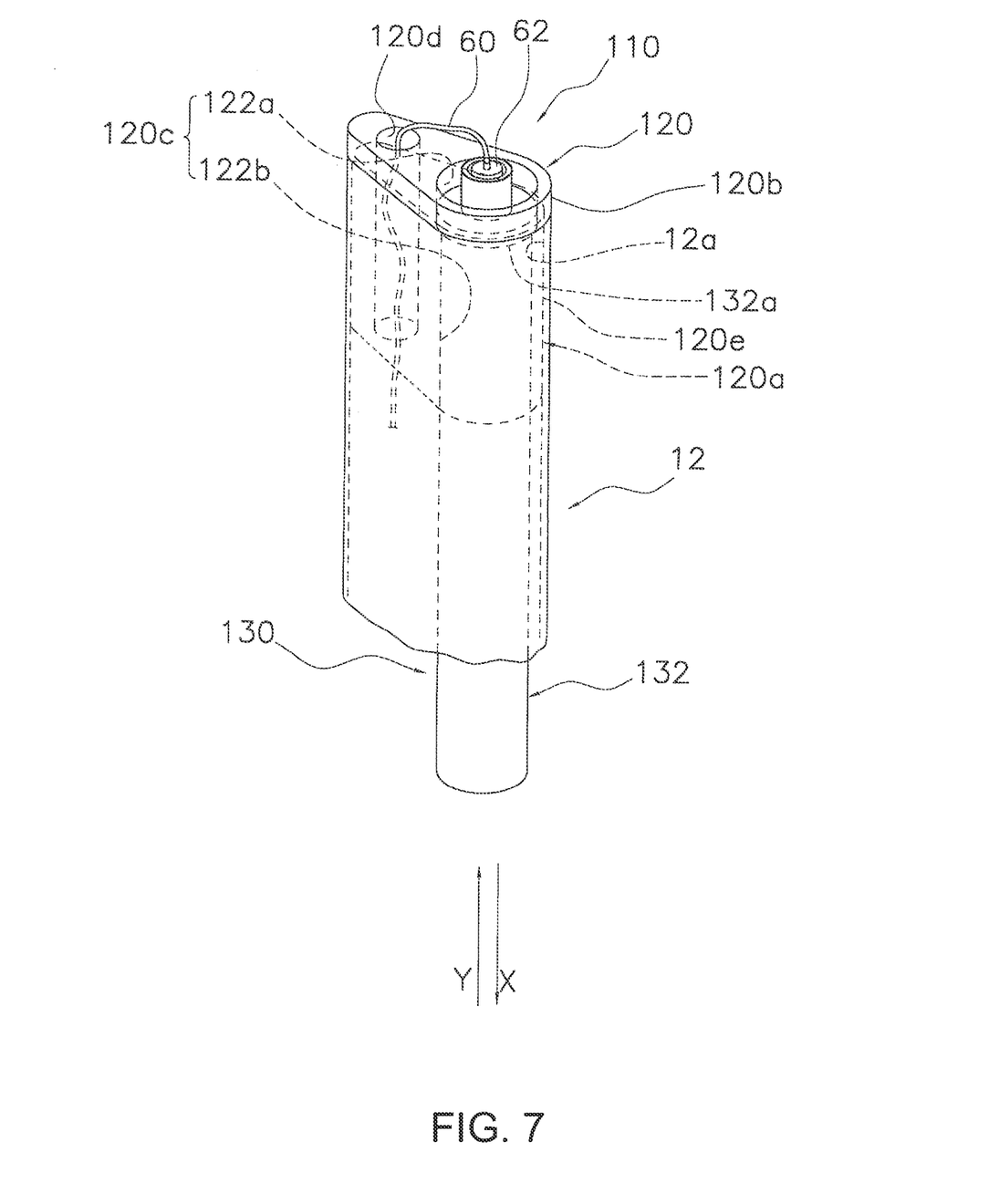
FIG. 7 is a perspective view, corresponding to FIG. 1, of an electric power source assembly having an electric power source holder according to a second embodiment.

Referring now to FIG. 7, an electric power storage assembly 110 according to a second embodiment will now be discussed. In this second embodiment, as shown in FIG. 7, the electric power storage assembly 110 comprises an electric power storage holder 120 and an electric power storage member 130. Unlike the first embodiment, the electric power storage holder 120 is constructed as a single piece. Similarly to the first embodiment, the electric power storage holder 120 is made of a synthetic resin. The electric power storage holder 120 fits into the seat tube 12 of the bicycle. The electric power storage holder 120 has an insertion or fitting section 120a, a restricting section 120b, a holding section 120c and a guide hole 120d. The insertion section 120a has an external circumferential surface 120e that fits into an internal circumferential surface of the seat tube 12. The external circumferential surface 120e has an outer contour that is raindrop-shaped in a plan view. The insertion section 120a is fitted into the open end section 12a of the seat tube 12 and frictionally fixed in the open end section 12a. The restricting section 120b is the same as the restricting section 20a of the first embodiment, except that the restricting section 120b is part of a single piece. Therefore, a detailed explanation of the electric power storage holder 120 is omitted herein. The holding section 120c comprises a larger diameter section 122a and a smaller diameter section 122b, which are adjoined through holes. The larger diameter section 122a is arranged closer to the restricting section 120b than the smaller diameter section 122b. The guide hole 120d guides the cable 60 similarly to the first embodiment.

The electric power storage member 130 has a case 132 and an electric power storage element (not shown) arranged inside the case 132. The case 132 has a flange 132a provided on the end portion located closer to the open end section 12a of the seat tube 12. The flange 132a is supported on a step-like portion formed between the larger diameter section 122a and the smaller diameter section 122b such that movement of the electric power storage element 132 in the direction X is restricted.

With either of the holders 20 and 120 explained heretofore, the holder 20 or 120 is installed inside a seat tube 12 configured to have a saddle mounted over an open end section 12a. As a result, the power storage member 30 or 130 can be held without degrading the aesthetic appearance of the bicycle.

With the first embodiment, it is easier to hold the electric power storage member 30 in the holder 20 because the holder 20 can be divided in two.

Since the electric power storage member 30 is positioned in the holder 20 by the positioning section 20c, the electric power storage member 30 can be held more reliably.

Since the cable 60 for supplying electric power from the electric power storage member 30 or 130 can be guided to the exterior of the seat tube 12 through the guide hole 20d or 120d provided in the holder 20 or 120, the cable 60 can be connected to and disconnected from the electric power storage member 30 or 130 while the holder 20 or 120 is installed on the bicycle frame.

Since the guide hole 20d is formed by a first groove 22c provided in the first member 22 and a second groove 24c provided in the second member 24, the cable 60 can be easily inserted and retracted through the guide hole 20d.

The holder 120 according to the second embodiment can be installed on a bicycle easily by inserting (fitting) it into the open end section 12d of the bicycle while the electric power storage section 130 is held in the holding section 120c.

In the electric power storage member 30, the electric power storage element 34 is arranged inside the case 32 and, thus, the electric power storage element 34 is not exposed to the outside. As a result, the service life of the electric power storage element 34 is improved.

Although embodiments of the present invention have been presented heretofore, the present invention is not limited to these embodiments and various modifications can be made without departing from the scope of the invention as defined by the claims. In particular, the embodiments and variations presented in this specification can be combined in any desired way.

Although in the previously explained embodiments the electric power storage assembly, the holder, and the electric power storage element are installed in the seat tube of a bicycle frame, the present invention is not limited to such an arrangement. For example, the invention also includes an electric power storage assembly, a holder, and an electric power storage element configured to be installed in an open end section of a steering column, a handlebar, or a handlebar stem of a bicycle.

Although in the previously explained embodiment a secondary battery is presented as an example of an electric power storage element, the present invention is not limited to a secondary battery. For example, it is acceptable to use a primary battery, an electric double-layer capacitor, or another large-capacity capacitor as the electricity storage element.

Although in the embodiments the recessed sections are provided in the case and the protruding sections are provided on the holder, it is acceptable to reverse this arrangement. Also, the recessed sections and the protruding sections have planar surfaces, it is acceptable for a hole to be used as a recessed section and a projection to be used as a protruding section.

Thus, the foregoing descriptions of the embodiments according to the present invention are provided for illustration only, and not for the purpose of limiting the invention as defined by the appended claims and their equivalents.

What is claimed is:

1. An electric power storage holder for insertion in a seat tube and for holding an electric power storage member, the electric power storage holder comprising:
   a restricting section configured to contact an end edge of an open end section of a seat tube to restrict axial movement of the holder in one of axial directions of the seat tube, the one of the axial directions being a direction in which the seat tube extends; and
   a holding section that holds the electric power storage member, the holding section being formed by a first member having a first contacting section that contacts the electric power storage member, and a second member having a second contacting section that removably engages with the first member and that contacts the electric power storage member,
   the restricting section comprising a first projecting section of the first member and a second projecting section of the first member, the first projecting section configured to protrude from an external surface of the first member and the second projecting section configured to protrude from an external surface of the second member.

2. The electric power storage older as recited in claim 1, further comprising
   a guide hole for guiding a cable from inside the seat tube to outside the seat tube.

3. The electric power storage holder as recited in claim 1, wherein
   the first member and the second member form a guide hole for guiding a cable from inside the seat tube to outside the seat tube, the guide hole being defined by a first groove provided in the first member and a second groove provided in the second member.

4. The electric power storage holder as recited in claim 1, further comprising
   a positioning section provided on at least one of the first contacting section and the second contacting section to position the electric power storage member.

5. The electric power storage holder as recited in claim 4, wherein:
   the positioning section includes one of a recessed section and a protruding section, the one of the recessed section and protruding section is configured to engage with the other of the protruding section and the recessed section, which is provided on the electric power storage member to position the electric power storage member.

6. The electric power storage holder as recited in claim 4, wherein
   the positioning section provided is configured to position the electric power storage member in the one of the axial directions, a direction perpendicular to the one of the axial directions, and in a rotational direction about the one of the axial directions.

7. An electric power source assembly including the electric power storage holder as recited in claim 1, and further comprising
   the electric power storage member.

8. The electric power source assembly as recited in claim 7, wherein
the electric power storage member includes a case held by the holder, and at least one electric power storage element arranged inside the case.

9. The electric power source assembly as recited in claim 8, wherein
the case has a cylindrical shape with at least one planar surface on an external circumferential surface thereof.

10. The electric power source assembly as recited in claim 8, wherein
the case has a cylindrical shape with at least one recessed section or protruding section on an external circumferential surface thereof.

11. The electric power source assembly as recited in claim 8, wherein
the electric power storage element is a secondary battery.

12. An electric power storage holder for insertion in an open end section of a bicycle and holding an electric power storage member, the electric power storage holder comprising:
    an insertion section inserted into the open end section and configured to frictionally fix in the open end section, and is configured to contact the electric power storage member;
    a holding section that holds the electric power storage member, the holding section being formed by a first member having a first contacting section that contacts the electric power storage member, and a second member having a second contacting section that removably engages with the first member and that contacts the electric power storage member; and
    a positioning section provided on at least one of the first contacting section and the second contacting section to position the electric power storage member.

13. An electric power source assembly including the electric power storage holder as recited in claim 12, and further comprising the electric power storage member.

14. The electric power source assembly as recited in claim 13, wherein
the electric power storage member includes a case held by the holder, and at least one electric power storage element arranged inside the case.

15. The electric power source assembly as recited in claim 14, wherein
the case has a cylindrical shape with at least one planar surface on an external circumferential surface thereof.

16. The electric power source assembly as recited in claim 14, wherein
the case has a cylindrical shape with at least one recessed section or protruding section on an external circumferential surface thereof.

17. The electric power source assembly as recited in claim 14, wherein
the electric power storage element is a secondary battery.

18. An electric power storage holder for insertion in a seat tube and for holding an electric power storage member, the electric power storage holder comprising:
    a restricting section configured to contact an end edge of an open end section of a seat tube to restrict axial movement of the holder in one of axial directions of the seat tube, the one of the axial directions being a direction in which the seat tube extends;
    a holding section that holds the electric power storage member, the holding section being formed by a first member having a first contacting section that contacts the electric power storage member, and a second member having a second contacting section that engages with the first member and that contacts the electric power storage member; and
    a positioning section provided on at least one of the first contacting section and the second contacting section to position the electric power storage member.

19. An electric power storage holder for insertion in a seat tube and for holding an electric power storage member, the electric power storage holder comprising:
    a restricting section configured to contact an end edge of an open end section of a seat tube to restrict axial movement of the holder in one of axial directions of the seat tube, the one of the axial directions being a direction in which the seat tube extends;
    a holding section that holds the electric power storage member, the holding section being formed by a first member having a first contacting section that contacts the electric power storage member, and a second member having a second contacting section that engages with the first member and that contacts the electric power storage member; and
    a guide hole for guiding a cable from inside the seat tube to outside the seat tube.

20. An electric power storage holder for insertion in a seat tube and for holding an electric power storage member, the electric power storage holder comprising:
    a restricting section configured to contact an end edge of an open end section of a seat tube to restrict axial movement of the holder in one of axial directions of the seat tube, the one of the axial directions being a direction in which the seat tube extends; and
    a holding section that holds the electric power storage member, the holding section being formed by a first member having a first contacting section that contacts the electric power storage member, and a second member having a second contacting section that engages with the first member and that contacts the electric power storage member,
    the first member and the second member forming a guide hole for guiding a cable from inside the seat tube to outside the seat tube, the guide hole being defined by a first groove provided in the first member and a second groove provided in the second member.

* * * * *